US012398028B2

(12) United States Patent
Hess

(10) Patent No.: US 12,398,028 B2
(45) Date of Patent: Aug. 26, 2025

(54) VEHICLE CAM JACK

(71) Applicant: David T. Hess, Johnson City, TN (US)

(72) Inventor: David T. Hess, Johnson City, TN (US)

( * ) Notice: Subject to any disclaimer, the term of this patent is extended or adjusted under 35 U.S.C. 154(b) by 103 days.

(21) Appl. No.: 18/093,409

(22) Filed: Jan. 5, 2023

(65) Prior Publication Data

US 2024/0228244 A1 Jul. 11, 2024

(51) Int. Cl.
*B66F 3/00* (2006.01)

(52) U.S. Cl.
CPC .................................... *B66F 3/005* (2013.01)

(58) Field of Classification Search
CPC .................................. B66F 3/005; B66F 3/00
See application file for complete search history.

(56) References Cited

U.S. PATENT DOCUMENTS 634,100 A 10/1899 Wise
1,549,479 A 8/1925 Flower
1,805,508 A 5/1931 Angelillo
1,961,659 A 6/1934 Castaneda
1,996,612 A 4/1935 Cook
2,709,066 A 5/1955 Stapleton
3,298,665 A * 1/1967 Sieloff .................... B66F 3/005 254/94
3,348,807 A * 10/1967 Rossnan ................. B66F 3/005 254/94
3,588,048 A 6/1971 Mccorrison
3,785,618 A 1/1974 Thiffault et al.
4,277,050 A 7/1981 Mostert
5,039,070 A * 8/1991 Warner ................... B66F 3/005 254/94
5,152,505 A 10/1992 Warner
5,228,651 A * 7/1993 Warner ................... B66F 3/005 254/94
5,615,863 A 4/1997 Bailey
6,053,477 A 4/2000 Price
9,352,942 B1 5/2016 Genier
9,586,796 B1 3/2017 Brand
2007/0252119 A1 11/2007 Kobacker et al.
2009/0127839 A1* 5/2009 Long ....................... B66F 3/005 280/757
2016/0159629 A1 6/2016 Lusty et al.
2017/0210437 A1 7/2017 Black et al.
2019/0366984 A1* 12/2019 Pieterse ................. B60D 1/665
2024/0228244 A1* 7/2024 Hess ....................... B66F 3/005

* cited by examiner

*Primary Examiner* — Lee D Wilson
(74) *Attorney, Agent, or Firm* — Blanchard Horton PLLC

(57) ABSTRACT

A jack comprises a planar frame having a support post and an arcuate edge member. A pivot socket is provided at a first end of the support post that is sized to receive and engage an axle portion of a vehicle. The arcuate edge member has a first end extending along the pivot socket, a second end adjacent a second end of the support post, and an outer arcuate edge extending outwardly between the first and second ends of the support post. The outer arcuate edge defines a radius of curvature greater than a length dimension of the support post. Thus, the jack is positionable between a first orientation to allow the pivot socket to receive and engage an axle of a vehicle and a second orientation to allow the support post to lift the axle.

14 Claims, 5 Drawing Sheets

VEHICLE CAM JACK

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF INVENTION

The present general inventive concept pertains to vehicle jacks, and more particularly to a vehicle cam jack designed to safely and conveniently elevate and lower a portion of a vehicle using forward and reverse motion of the vehicle.

BACKGROUND

In the use of wheeled vehicles, such as automobiles, trailers, etc., it occasionally becomes necessary to raise and lower one or more wheels of the vehicle in order to gain more convenient access to the wheel or an underside portion of the vehicle. For example, in the case of vehicles employing compressed air-filled tires, repair of a flat tire may require that the vehicle, or a portion thereof, be lifted in order to raise the tire from contact with the ground. The raised tire may then be removed from the vehicle and replaced or repaired.

Numerous devices exist to accomplish raising and lowering of a vehicle or a portion thereof, such devices commonly referred to as "jacks." One type of jack is the so-called "cam" jack, which, in various designs, uses an arcuately shaped support member having a pivot attachment at one end which is adapted to engage an axle of the vehicle. The arcuate support member defines an arcuate rolling surface, such as for example a spiral shape or a series of segmented surfaces defining an oblong shape, such that when the axle of the vehicle is engaged by the pivot attachment at one end of the cam jack and the vehicle is rolled toward the opposite end of the cam jack, rotation of the cam jack beneath the vehicle results in the cam jack lifting the engaged axle and an associated portion of the vehicle from the vehicle's resting configuration. In typical designs, a cam jack is sized to correspond to a particular height, such that the cam jack may be easily placed beneath a vehicle to engage an axle of the vehicle, and such that the lifting provided by the cam jack is sufficient to lift at least one wheel of the vehicle from the ground.

Cam jacks often provide certain advantages over other designs of jacking devices. For example, in many designs, cam jacks are composed of a single unitary piece, rather than a series of interconnected moving parts. Hence, a cam jack often exhibits increased durability and a decreased chance of mechanical malfunction or misuse compared to other more complex mechanical jacking devices. Additionally, because cam jacks may consist of a single piece, they are often able to be deployed more rapidly and with less effort on the part of the user that other jack designs. In various designs, cam jacks are designed to occupy a relatively flat, planar shape. Thus, many cam jacks may be stored conveniently within a vehicle or adjacent a vehicle's exterior. However, though many designs of cam jacks offer numerous advantages over other mechanical jack designs, several cam jack designs also suffer from several shortcomings.

For example, in many designs, cam jacks are provided with pivot attachments that fit loosely around the axle of a vehicle and/or that do not retain the axle within the socket. In such designs, particular care must be paid that the cam jack is installed securely against the axle, along a near perfectly vertical plane that extends perpendicular to a rolling direction of the axle. Otherwise, misalignment of the cam jack in relation to the axle and/or a vertical orientation to the ground may result in the cam jack "slipping out" from engagement with the axle, either by the cam jack becoming disengaged from the axle itself, or by the cam jack sliding along the ground surface due to non-vertical loads placed on the cam jack by the vehicle. This may be particularly problematic in cam jacks that are used on uneven ground or on an inclined surface.

Additional shortcomings may be encountered in a cam jack in which no feature is provided to prevent over-rotation of the cam jack once the vehicle is rolled to a "lifted" orientation of the jack. In many cam jack designs, allowing the vehicle to roll a limited distance and allowing the cam jack to rotate beneath the vehicle to a certain degree may result in the cam jack lifting the axle from a resting position. However, continued rolling of the vehicle and rotation of the cam jack beyond the optimal distance/degree for lifting of the vehicle may result in "over-rotation," wherein the cam jack effectively "tips over" beyond the lifted orientation and is no longer positioned fully beneath the axle to support the vehicle in the elevated position. In certain situations, excessive over-rotation of the cam jack may result in the vehicle being re-lowered to the ground, and in other more extreme situations, such over-rotation may result in uncontrolled dropping of the vehicle, creating a potentially unsafe condition for objects and individuals in the vicinity of the jack and/or the vehicle.

In light of the above, there exists a desire to provide an improved vehicle cam jack which addresses one or more of the above-discussed limitations while remaining relatively quick and easy to store and deploy to lift a wheel and/or axle portion of a vehicle. There is a desire to provide an improved vehicle cam jack which may, in various embodiments, limit or control the negative effects of over-rotation of the cam jack on maintaining lift of the vehicle. There is a further desire to provide an improved vehicle cam jack which may, in various embodiments, provide a more safe and secure lifting mechanism for lifting a vehicle than devices currently known in the prior art, or which may provide a lifting mechanism which may be used more evenly and more conveniently on uneven or non-horizontal terrain, as compared to other devices currently known in the prior art.

BRIEF SUMMARY OF THE INVENTION

According to various example embodiments of the present general inventive concept, a jack for lifting an axle portion of a vehicle is provided that includes generally a planar frame comprising a support post and an arcuate edge member, and a pivot socket defined at a first end of the support post. Various example embodiments of the present general inventive concept may include a pivot socket which is sized to receive and engage an axle portion of a vehicle. Various example embodiments of the present general inventive concept may include an arcuate edge member that has a first end extending along the pivot socket, a second end adjacent a second end of the support post, and an outer arcuate edge extending outwardly between the first and second ends of the support post. Various example embodiments of the present general inventive concept may include an outer arcuate edge which defines a radius of curvature greater than a length dimension of the support post. In various example embodiments of the present general inventive concept, the jack may be positionable in a first orientation with the support post extending horizontally and the outer arcuate edge below the support post to allow the pivot socket to receive and engage an axle of a vehicle. In various example embodiments, the jack may be rotatable along the outer arcuate edge to a second orientation to allow the support post to extend beneath the pivot socket and rest on a portion of the outer arcuate edge adjacent the second end of the support post.

The foregoing and/or other aspects and advantages of the present general inventive concept may be achieved by providing a jack in which the first end of the support jack forms a first side of the pivot socket. Additional aspects and advantages of the present general inventive concept may be achieved by providing a jack in which the first end of the support jack defines a substantially straight edge. In various embodiments, the jack may further comprise a contact plate extending perpendicularly along the straight edge of the support jack first end. In various embodiments, the frame may further comprise a plurality of bracing members extending between the support post and the arcuate edge member. In various embodiments, a first of the bracing members may extend from the first end of the support post to a portion of the arcuate edge member proximate the first end of the arcuate edge member, the first bracing member forming a second side of the pivot socket. In various embodiments, the first end of the arcuate edge member may form a third side of the pivot socket. In various embodiments, the second end of the support post may define a substantially straight edge extending acute to a long dimension of the support post.

In various embodiments, the jack may further comprise a stabilizing plate extending perpendicularly along at least a portion of the outer arcuate edge of the arcuate edge member. In various embodiments, the outer arcuate edge and the stabilizing plate may each extend along the substantially straight edge of the support post second end to define a support platform. In various embodiments, the stabilizing plate may further extend along the outer arcuate edge between a midpoint of the outer arcuate edge and the support post second end. In various embodiments, the stabilizing plate may be tapered outwardly from midpoint of the outer arcuate edge to the support post second end. In various embodiments, a plurality of cleats may be defined along the outer arcuate edge at spaced apart locations between the midpoint of the outer arcuate edge and the support post second end. In various embodiments, each of the bracing members may extend from the support post first end to one of a plurality of spaced apart locations along the arcuate edge member. In various embodiments, the support post, bracing members, arcuate edge member, and cleats may be integrally formed. In various embodiments, the support post, bracing members, arcuate edge member, and cleats may be formed from a unitary sheet of rigid material.

Additional aspects and advantages of the present general inventive concept will be set forth in part in the description, drawings, and claims which follow, and, in part, will be obvious from the description, or may be learned by practice of the present general inventive concept.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
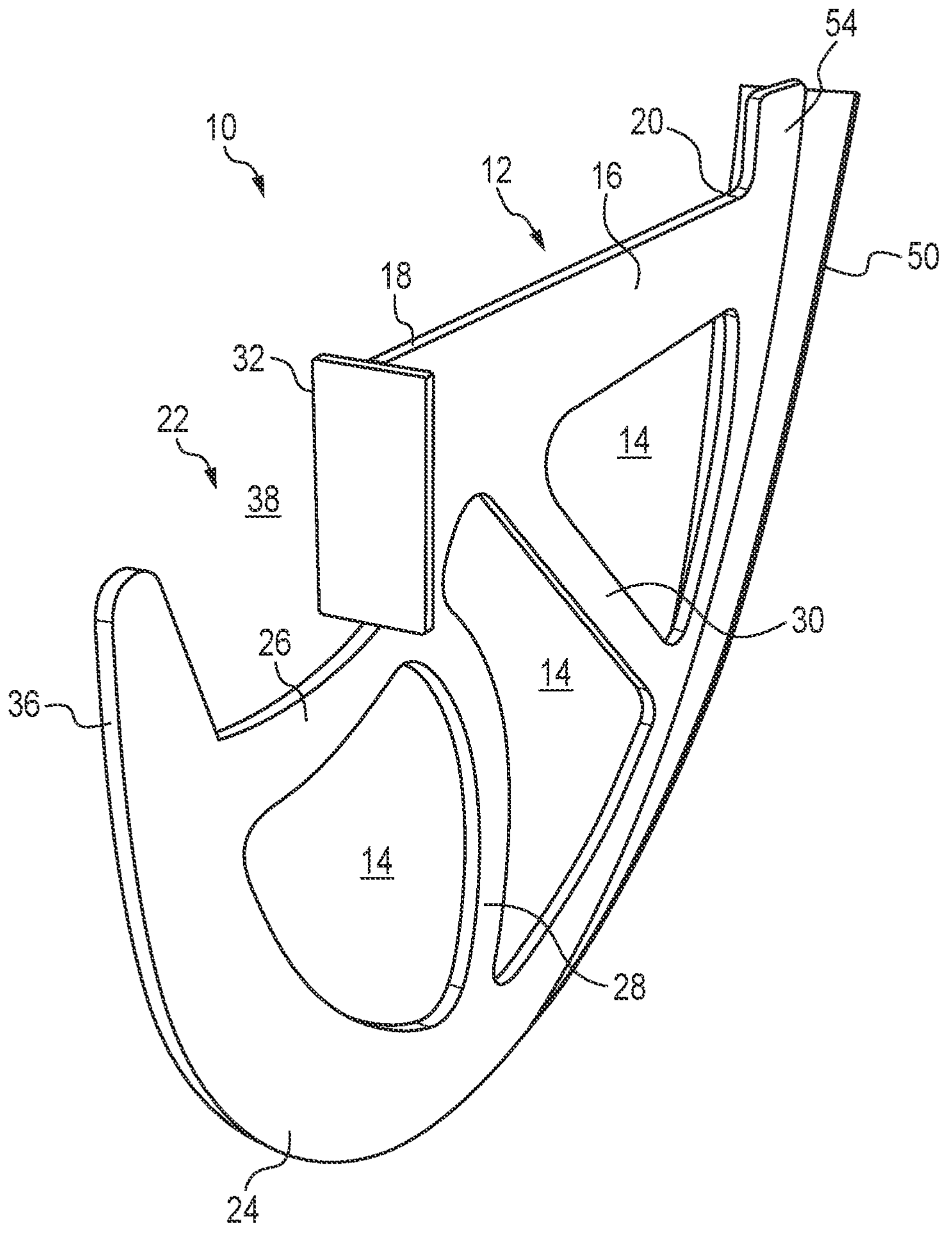
FIG. 1 illustrates a first perspective view of a vehicle cam jack constructed according to one example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a vehicle cam jack, or "jack," is provided that includes a substantially rigid support frame having an arcuate outer edge extending along an outwardly curved path along a perimeter thereof between opposite first and second ends. The jack includes a pivot socket defined at a first end of the frame and a substantially flat support surface defined at an opposite second end of the frame. The pivot socket is sized, shaped, and configured to receive an axle of a vehicle rotatably therein and to maintain the axle in an orientation perpendicular to the arcuate outer edge of the frame. The support surface is positioned to extend along a plane substantially parallel to, and spaced apart from, an axial dimension of a vehicle axle received within the socket, and substantially perpendicular to the arcuate outer edge of the frame. The radius of curvature of the arcuate outer edge is generally shorter than the distance between the socket, at one end of the frame, and the support surface, at the opposite end of the frame. Thus, when the jack is placed in a first orientation, with the socket and the support surface in a substantially horizontal side-by-side relationship and the arcuate outer edge extending generally downwardly therebetween, the jack may be positioned beneath a vehicle and a vehicle axle may be received within the socket. Thereafter, the jack may be rolled along the arcuate outer edge toward a second orientation, in which the support surface is oriented substantially beneath the socket, thus allowing the greater distance between the socket and the support surface to force separation between the vehicle axle and the surface underlying the jack.

FIG. 1 illustrates a jack 10 constructed in accordance with one example embodiment of the present general inventive concept. In the example embodiment illustrated in FIG. 1, the jack 10 includes a support frame 12 which is fabricated from a unitary, substantially planar sheet of rigid material, such as steel, iron, polymer, or the like, and has a plurality of central through openings 14 defined therein. The through openings 14 are provided to reduce the overall weight of the jack 10, and the through openings 14 cooperate to define a plurality of integrally-formed support members extending along a planar orientation between the various through openings 14 in the support frame 12. More specifically, the support frame 12 in the illustrated embodiment defines generally an elongated, flat, substantially straight support post 16 having a first end 18 and opposite second end 20. As will be discussed in additional detail below, a pivot socket 22 is defined at a first end 18 of the support post 16. The support frame 12 further defines a flat, arcuate edge member 24 extending along an outwardly curved path coplanar with the support post 16 from the second end 20 of the support post 16 to a distal end of the pivot socket 22 opposite from the support post first end 18. The support frame 12 further defines a plurality of elongated bracing members 26, 28, 30, with each bracing member extending from a respective location proximate the support post first end 18 to a respective location along the arcuate edge member 24.

Figure 2:
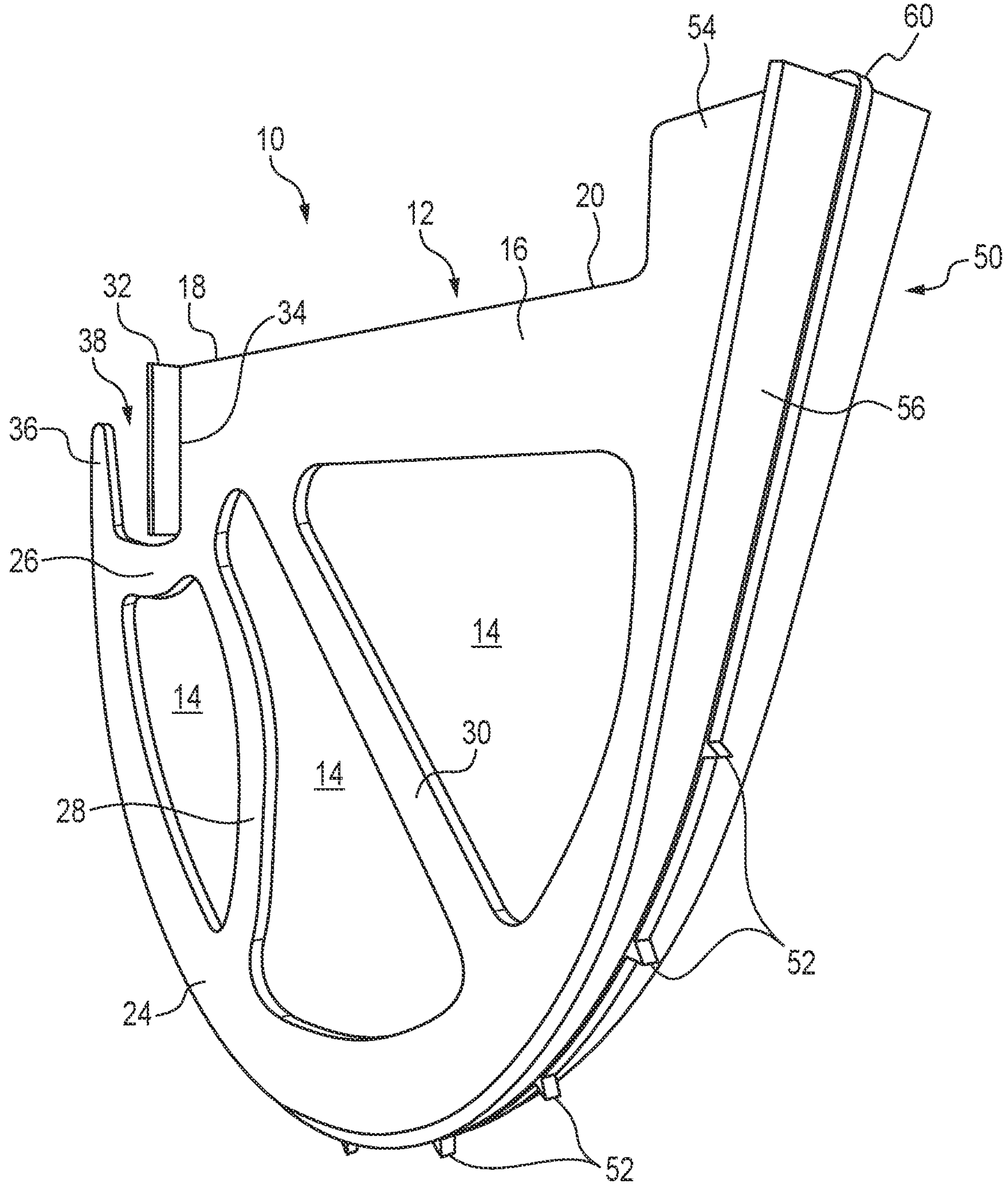
FIG. 2 illustrates a second perspective view of the vehicle cam jack of the example embodiment illustrated in FIG. 1.
Figure 3:
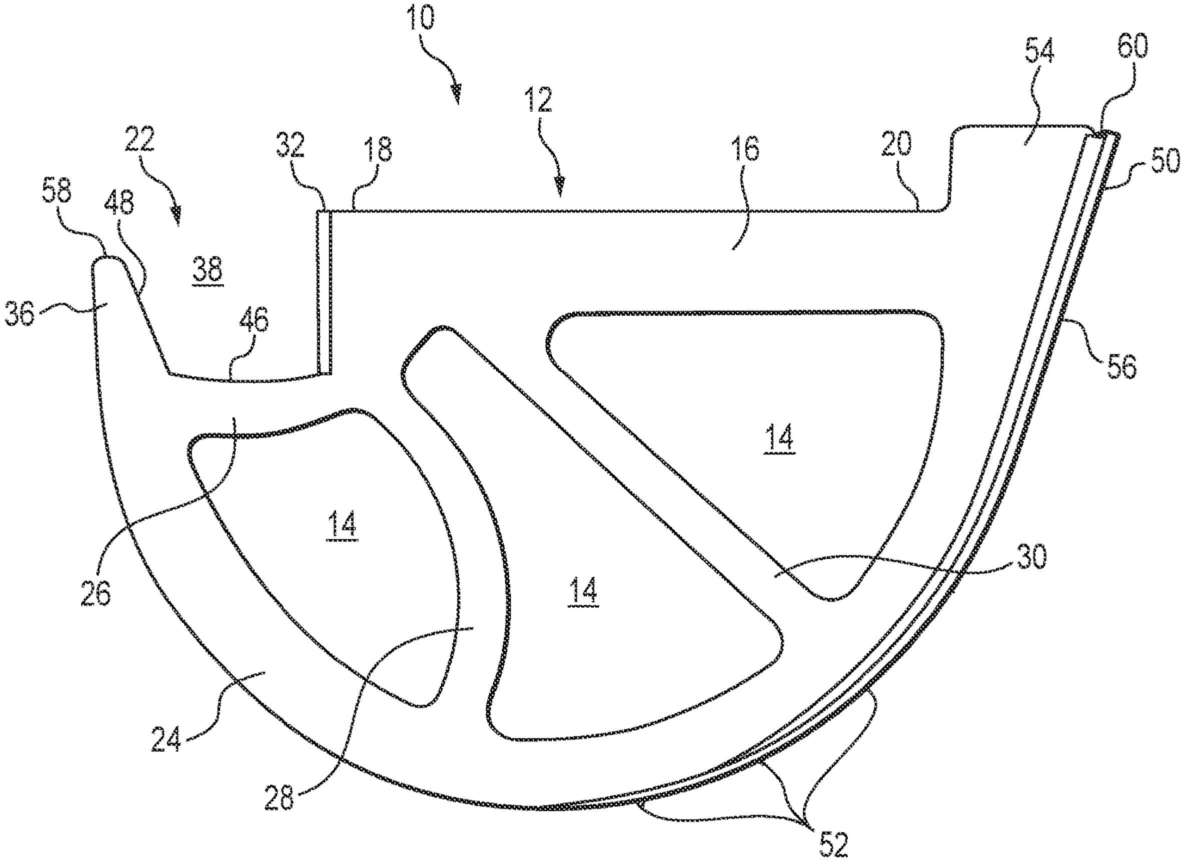
FIG. 3 illustrates a side elevation view of the vehicle cam jack of the example embodiment illustrated in FIG. 1.

With reference to FIGS. 1-3, in the illustrated embodiment, the pivot socket 22 is defined by certain components of the frame 12 proximate the support post first end 18, as well as a contact plate 32 extending along an upper edge of the support post 18, perpendicular to the plane of the frame 12. More specifically, in the illustrated embodiment, the support post first end 18 defines a substantially straight upper edge 34 extending generally perpendicular to a long dimension of the support post 16. A contact plate 32 is provided having a generally flat, rectangular shape with a long dimension corresponding to a length of the upper edge 34 of the support post first end 18. The contact plate 32 is fixed along the upper edge 34 of the support post 16 as by a suitable weld, adhesive, integral connection, or the like, and the contact plate 32 extends in a plane generally parallel to the upper edge 34 of the support post 16 and perpendicular to the horizontal plane defined by the support frame 12.

In the illustrated embodiment, a first of the bracing members 26 extends inwardly from an inward side of the support post first end 18 and curves distally away from the support post first end 18 along a direction generally parallel with the long dimension of the support post 16. Thus, the first bracing member 26 extends from a region of the support post first end 18 adjacent the contact plate 32 to a region proximate a first end 36 of the arcuate edge member 24 which overhangs the first end 18 of the support post 16. In this configuration, respective inner edges of the first end 36 of the arcuate edge member 24 and the first bracing member 26 cooperate with the contact plate 32 to form a spanner shaped pivot socket 22 having an open side 38 facing outwardly from the support post first end 18, in a direction parallel to the plane of the contact plate 32, parallel to the plane of the frame 12, and perpendicular to the long dimension of the support post 16.

With reference to FIGS. 1 and 2, in various embodiments, a stabilizing plate 50 is provided extending along a portion of the outer arcuate edge of the arcuate edge member 24. In the illustrated embodiment, the stabilizing plate 50 consists of a rigid, arcuate plate conforming along the outer arcuate edge of the arcuate edge member 24 and extending generally outwardly from either side of the arcuate edge member 24, perpendicular to the frame 12. In the present embodiment, the stabilizing plate 50 defines a tapered shape, beginning at an approximate midpoint of the outer arcuate edge of the arcuate edge member 24 and widening on either side of the arcuate edge member 24 toward an end of the stabilizing plate 50 adjacent the second end 20 of the support member 16. In the illustrated embodiment, a second end 54 of the arcuate edge member 24 adjacent the second end 20 of the support post 16 defines a substantially straight portion of the outer arcuate edge. Those portions of the stabilizing plate 50 adjacent the second end 54 the arcuate edge member 24 are correspondingly flat in order to conform to the straight portion second end 54 of the arcuate edge member 24 and to extend orthogonally along the outer arcuate edge. Thus, the portions of the stabilizing plate 50 and the second end 54 of the arcuate edge member 24 adjacent the second end 20 of the support member 16 cooperate to define a relatively flat, rigid support platform 56 upon which the support post 16 may rest. In the illustrated embodiment, the support platform 56 extends along the second end 54 of the arcuate edge member 24 at an angle slightly acute to an inside surface of the support post 16 facing the arcuate edge member 24. Thus, when the support post 16 rests upon the platform 56 with the platform substantially flat on a horizontal surface, the support post 16 is biased slightly toward the arcuate edge member 24.

In various embodiments, a plurality of cleats 52 are provided at spaced apart locations along the outer arcuate edge of the arcuate edge member 24 in order to increase traction along the outer arcuate edge of the arcuate edge member 24. In the illustrated embodiment, the cleats 52 are disposed at spaced apart locations between the approximate midpoint of the outer arcuate edge of the arcuate edge member 24 and the platform portion 56 of the stabilizing plate 50 adjacent the second end 20 of the support member 16. However, it will be recognized that additional cleats may be provided at other locations along the outer arcuate edge of the arcuate edge member 24 without departing from the spirit and scope of the present general inventive concept. Furthermore, it will be recognized that numerous other devices, shapes, and configurations exist to provide increased traction along the outer arcuate edge of the arcuate edge member 24, and such alternate devices, shapes, and configurations may be used without departing from the spirit and scope of the present general inventive concept.

Figure 4:
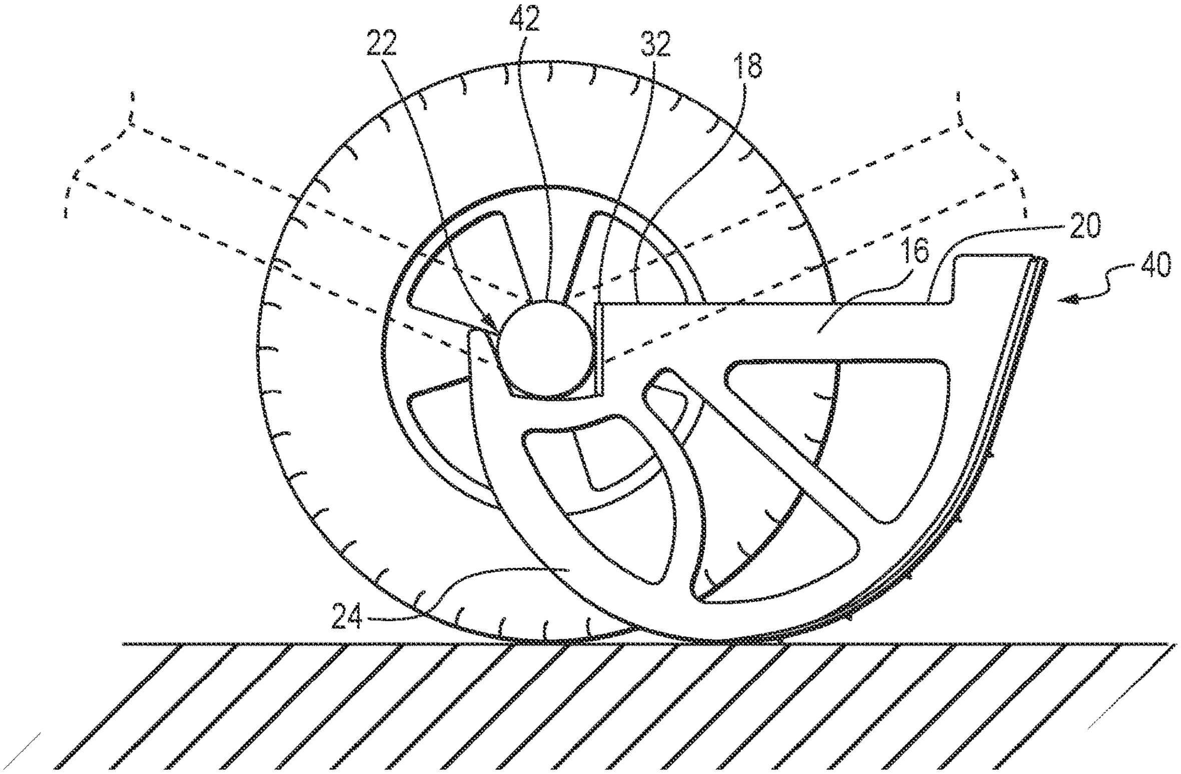
FIG. 4 illustrates a side schematic view of a wheel of a vehicle and a corresponding axle, showing the vehicle cam jack of the example embodiment illustrated in FIG. 1 positioned on the axle in a first position.
Figure 5:
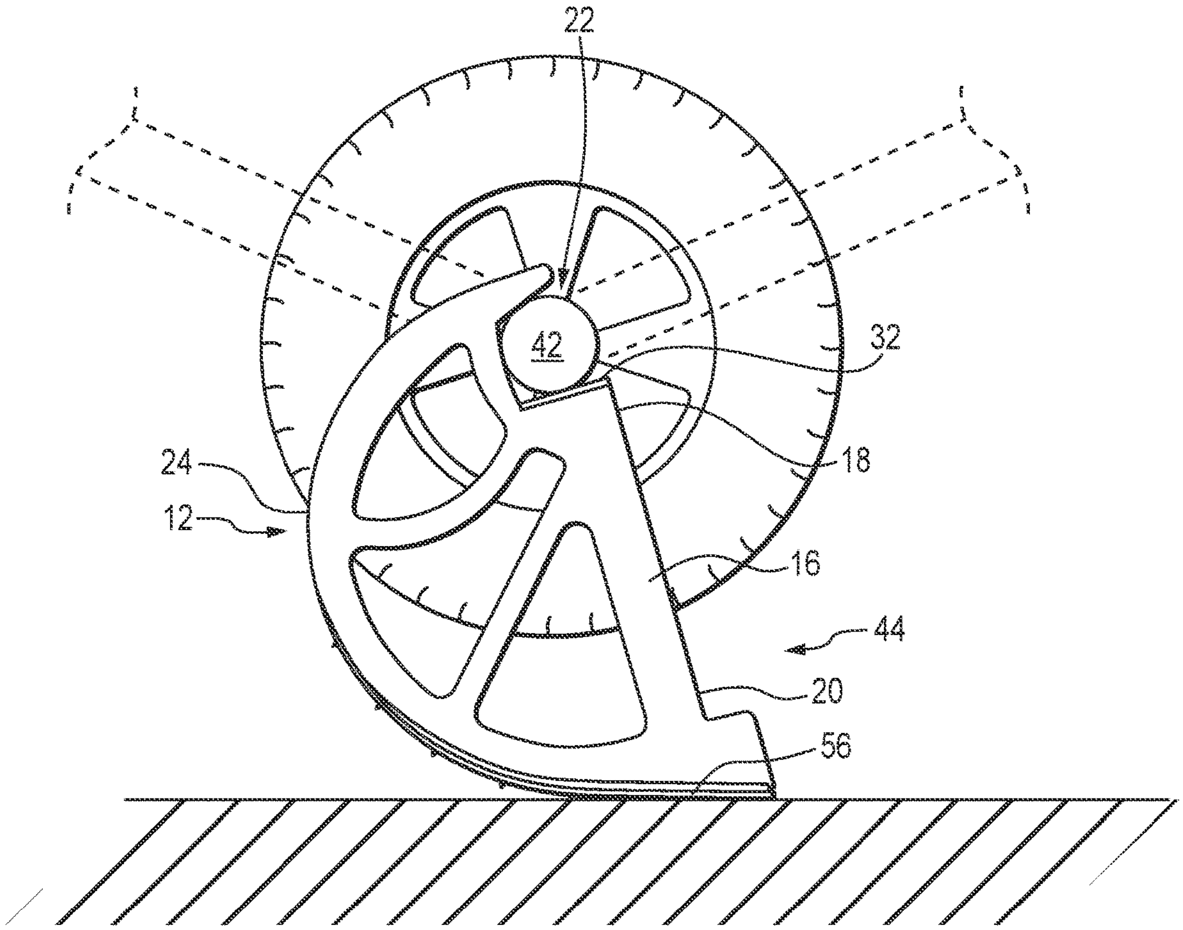
FIG. 5 illustrates a side schematic view of the vehicle wheel of FIG. 4, showing the vehicle cam jack of the example embodiment illustrated in FIG. 1 positioned on the axle in a second position.

With reference to FIGS. 3 and 4, it will be recognized that the jack 10 may be brought to a first orientation 40, in which the open side 38 of the pivot socket 22 faces generally upward, the support post 16 extends generally horizontally, and the arcuate edge member 24 extends beneath the support post 16 between the first and second ends 18, 20 thereof. In this first orientation 40, the jack 10 may be placed beneath a vehicle having an axle 42, and the axle 42 may be received within the pivot socket 22, with a central portion of the arcuate edge member 24 resting on the ground beneath the vehicle. Thereafter, the jack may be moved to a second orientation 44 (see FIG. 5), in which the frame 12 is rotated about the pivot socket 22 such that the contact plate 32 is substantially below the axle 42, the open side 38 of the pivot socket 22 faces generally horizontally from the axle 42, and the support post 16 extends generally downwardly between the axle 42 and a portion of the ground beneath the vehicle. In this second orientation, the platform 56 rests upon the ground beneath the vehicle and the support post 16 rests upon the platform 56, with the support post 16 extending at a slight angle to vertical toward the arcuate edge member 24. Thus, when the jack 10 is brought to the first orientation 40 and placed beneath a vehicle in engagement with an axle 42, the narrow end of the support plate 50 is positioned at a lower-most point of the arcuate edge member 24 nearest the ground. As the jack 10 is rotated toward the second orientation 44, the portion of the stabilizing plate 50 contacting the ground beneath the vehicle changes, favoring the wider end of the stabilizing plate 50, nearest the second end 20 of the support member 16. As the jack 10 is rotated toward the second orientation 44, the wider portion of the stabilizing plate 50 at the second end 20 of the support member 16 serves to provide increased stability to the support member 16, which in this orientation supports the weight of the axle 42 and corresponding vehicle. It will be recognized that the cleats 52 serve to increase traction between the outer arcuate edge of the arcuate edge member 24 and the ground beneath a vehicle as the jack 10 is rotated between the first and second orientations 40, 44.

In various embodiments, the jack 10 is provided with a number of stop devices and features in order to limit and/or hinder rotation of the jack 10 beyond the second orientation 44, and/or to accommodate inadvertent movement of the vehicle beyond the rotational limits of the jack 10. For example, with reference to FIG. 3, in the illustrated embodiment, the pivot socket 22 of the jack 10 is sized and configured to correspond to a cross-sectional diameter of an axle 42 received therein such that the axle 42 may make contact with both the contact plate 32 and a rear edge 46 of the socket 22 defined by an outer edge of the first bracing member 26. In certain embodiments, the pivot socket 22 may be sized to correspond to an axle 42 received therein such that the axle 42 may contact both the contact plate 32 and a rear edge 46 of the socket 22, as well as an inner edge 48 of the first end 36 of the arcuate edge member 24. In the illustrated embodiment, the first end 36 of the arcuate edge member 24 defines a tapered shape with an inner edge 48 that extends at an outwardly flared angle to the contact plate 32. Thus, it will be recognized that, in this embodiment, a range of diameters exist of axles which may be received within the pivot socket 22 and which may contact the contact plate 32, the socket rear edge 46, and the first end inner edge 48 of the arcuate edge member 24.

In the illustrated embodiment, the tapered shape of the first end 36 of the arcuate edge member 24 is sized and configured to allow the outer edge 58 of the first end 36 of the arcuate edge member 24 to contact an underside of the vehicle when the jack 10 is rotated to the second orientation 44. In this regard, in embodiments in which the axle of the vehicle is sized to fit snugly within the pivot socket 22, with the axle contacting all three surfaces of the contact plate 32, the rear edge 46 of the socket 22, and the inner edge 48 of the first end 36 of the arcuate edge member 24, rotation of the jack 10 toward the second orientation 44 serves to establish a frictional connection, i.e., "wedge," the first end 36 of the arcuate edge member 24 between the axle and the vehicle. Thus, in various embodiments, the first end 36 of the arcuate edge member 24 serves as a stop to limit rotation of the jack 10 significantly beyond the second orientation 44.

In certain embodiments, the first end 36 of the arcuate edge member 24 is sized and shaped to accommodate slight rotation of the jack 10 beyond the second orientation 44. In these embodiments, it will be recognized that over-rotation of the jack 10 beyond the second orientation 44 results in rotation of the support post 16 to a vertical or near-vertical orientation, thus, rotation of the platform 56 beyond the orientation in which the platform 56 lies flush with the ground beneath the vehicle. In other words, over-rotation of the jack 10 beyond the second orientation 44 results in the majority of the platform 56 being lifted from contact with the ground beneath the vehicle and the jack 10 resting on a trailing edge 60 of the arcuate edge member 24. Thus, in the event the jack is over-rotated beyond the second orientation 44, the first end 36 of the arcuate edge member 24 may become locked in place between the axle of the vehicle and the portion of the vehicle above the axle. At the same time, the jack 10 may be rotated such that the jack is lifted from the majority of the platform 56 and rests on the trailing edge 60 of the arcuate edge member 24, thereby decreasing the surface area of the platform 56 contacting the ground beneath the vehicle and allowing the jack 10 to slide along the ground. In this way, the jack 10 may be maintained beneath the vehicle a short distance as the vehicle is moved beyond the limits of rotation of the jack 10.

From the foregoing, it will be recognized that a vehicle cam jack 10 is provided which allows for quick, safe, and convenient lifting of an axle portion of a vehicle, while also including additional safety features to accommodate inadvertent over-rotation of the jack 10 beneath the vehicle. In several embodiments, the frame 12 of the jack 10 is of a substantially planar configuration, and the contact plate 32 and stabilizing plate 50 are each of a width less than a few inches, and preferably less than two inches, such that the entire width of the jack 10 is less than two inches. In these embodiments, the jack 10 may be stored in a relatively planar configuration along a vehicle, such as beneath a vehicle, adjacent a side of the vehicle, in a trunk or other storage area of a vehicle, or adjacent a spare tire stored on or in the vehicle.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A jack for lifting an axle portion of a vehicle, the jack comprising:

a planar frame comprising a support post and an arcuate edge member; and a pivot socket defined at a first end of the support post, the pivot socket comprising a contact plate positioned at the support post first end and extending perpendicularly outwardly from the planar frame and perpendicular to an elongate dimension of the support post, the pivot socket further comprising a side member defined by the planar frame and extending substantially perpendicular to the contact plate opposite the support post and a tapered member defined by the planar frame and extending substantially perpendicular to the side member and substantially parallel along a planar surface of the contact plate;

wherein the pivot socket is sized to receive and engage an axle portion of a vehicle;

wherein the arcuate edge member has a first end extending along the tapered member of the pivot socket, a second end adjacent a second end of the support post, an outer arcuate edge extending outwardly between the first and second ends of the support post, and an offset portion extending outwardly from the second end of the support post opposite the outer arcuate edge; and a stabilizing plate extending perpendicularly from the offset portion and along at least a portion of the outer arcuate edge;

wherein the outer arcuate edge defines a radius of curvature greater than a length dimension of the support post;

whereby the jack is positionable in a first orientation with the support post extending horizontally and the outer arcuate edge below the support post to allow the pivot socket to receive and engage an axle of a vehicle, and whereby the jack is rotatable along the outer arcuate edge to a second orientation to allow the support post to extend beneath the pivot socket and rest on a portion of the outer arcuate edge adjacent the second end of the support post.

2. The jack of claim 1, wherein the first end of the support jack forms a first side of the pivot socket.

3. The jack of claim 2, wherein the first end of the support jack defines a substantially straight edge.

4. The jack of claim 1 wherein the frame further comprises a plurality of bracing members extending between the support post and the arcuate edge member.

5. The jack of claim 4, wherein a first of the bracing members extends from the first end of the support post to a portion of the arcuate edge member proximate the first end of the arcuate edge member, the first bracing member forming the side member of the pivot socket.

6. The jack of claim 5, the first end of the arcuate edge member forming the tapered member of the pivot socket.

7. The jack of claim 6, the second end of the support post defining a substantially straight edge extending acute to a long dimension of the support post along the offset portion of the arcuate edge.

8. The jack of claim 7, wherein the outer arcuate edge and the stabilizing plate each extend along the substantially straight edge of the support post second end and the offset portion of the arcuate edge to define a support platform.

9. The jack of claim 8, wherein the stabilizing plate further extends along the outer arcuate edge between a midpoint of the outer arcuate edge and the support post second end.

10. The jack of claim 9, wherein the stabilizing plate is tapered outwardly from midpoint of the outer arcuate edge to the support post second end.

11. The jack of claim 10 further including a plurality of cleats defined along the outer arcuate edge at spaced apart locations between the midpoint of the outer arcuate edge and the support post second end.

12. The jack of claim 11, wherein each of the bracing members extends from the support post first end to one of a plurality of spaced apart locations along the arcuate edge member.

13. The jack of claim 12, wherein the support post, bracing members, arcuate edge member, and cleats are integrally formed.

14. The jack of claim 13, wherein the support post, bracing members, arcuate edge member, and cleats are formed from a unitary sheet of rigid material.

* * * * *